United States Patent [19]
Peake

[11] 4,405,048
[45] Sep. 20, 1983

[54] FUEL TANK DRAIN KIT AND PROCESS

[76] Inventor: Gilbert R. Peake, 16615 Bud Rd., Poolesville, Md. 20879

[21] Appl. No.: 352,242

[22] Filed: Feb. 25, 1982

[51] Int. Cl.³ .................... B65D 69/00; B65D 71/00
[52] U.S. Cl. .................................. 206/582; 220/288; 220/DIG. 6; 138/97; 138/99
[58] Field of Search .............. 220/288, DIG. 6; 206/582; 137/585; 138/97, 99; 184/1.5

[56] References Cited
U.S. PATENT DOCUMENTS

| | | | |
|---|---|---|---|
| 1,792,827 | 2/1931 | Farkas | 220/DIG. 6 |
| 2,001,610 | 5/1935 | Hildenbrand | 220/DIG. 6 |
| 4,357,961 | 11/1982 | Chick | 138/97 |

Primary Examiner—George T. Hall
Attorney, Agent, or Firm—Michael W. York

[57] ABSTRACT

Apparatus and a process for permitting the fuel tank of a motor vehicle to be drained periodically to remove accumulated water, dirt and contaminated fuel. The apparatus includes a kit which includes an attaching member which is adapted to be attached to the lower outer portion of the fuel tank. The attaching member has a threaded hole through it and a bolt with a washer is provided which is adapted to be threaded into the hole. After the attaching member has been attached to the fuel tank a hole is drilled through the fuel tank in the central portion of the threaded hole in the attaching member. The bolt and washer effectively prevent leakage of fuel through this hole until the tank is to be drained.

2 Claims, 2 Drawing Figures

FUEL TANK DRAIN KIT AND PROCESS

BACKGROUND OF THE INVENTION

The fuel tanks of motor vehicles and the like tend to accumulate water, dirt and contaminated fuel for a number of reasons. Water accumulates in the fuel tanks because there is moisture which is present in the air within the fuel tank which remains in the air at elevated temperatures, but condenses out when the temperature is lowered since the air at the lower temperature is not capable of holding the moisture which was present at the higher temperatures. This water then contaminates the fuel in the tank and at very low temperatures is responsible for the gas line freeze ups which occur particularly when fuel tanks are permitted to remain relatively close to empty at low temperatures.

Water and dirt and contaminated fuel can be also introduced into the fuel tank of a motor vehicle when the fuel tank is filled with fuel which has water, dirt or other contaminants in it. The fuel can become contaminated with water through substantially the same process that takes place in the vehicle fuel tank. However, in this connection it is the moisture in the air in the service station tank that contaminates the fuel with water.

Obviously, fuel filters have been installed in motor vehicles to remove at least some of these contaminants. However, some of the contaminants still get through particularly water which may be in the fuel.

The effects of water, dirt and other contaminants on the operation of the motor vehicle's fuel system and engine will, of course, vary according to the type of contamination and the severity of the contamination, but the effects can result in fuel system and engine damage due to corrosion, abrasion and other adverse reactions as well as poor engine performance and possibily hard starting of the engine.

These effects can be particularly severe in the case of diesel motor vehicles since water and other contaminants can clog the fuel filter, particularly in cold weather, and block the filter so that it is virtually impossible to start the engine. In addition, damage can result to the fuel injectors and other parts of the diesel engine due to contaminated fuel. Recently, there have been numerous complaints about diesel engine repairs which can perhaps be related to contaminated diesel fuel which is apparently to some degree prevalent in the United States.

The present invention provides the means to eliminate the problems associated with the presence of contaminated fuel in the tanks of motor vehicles. Most of the contaminants, including water, in the fuel in the fuel tank of the motor vehicle are located in the bottom portion of the fuel tank. Unfortunately, there is presently no easy way to eliminate such contamination without pumping out the fuel tank or by draining it which may require the removal of the tank or other difficult procedures. With the present invention it is easy to periodically drain the contaminants from the fuel tank so as to keep the fuel tank free of contamination.

BRIEF DESCRIPTION OF THE INVENTION

This invention relates to apparatus and processes for removing contaminants from the fuel in the fuel tank of a motor vehicle and more particularly to apparatus and a process which permit draining of contaminated fuel from the tank.

Accordingly, it is an object of the present invention to provide apparatus and a process which make it possible to remove contaminants from the fuel in the fuel tank of a motor vehicle.

It is also an object of the present invention to provide apparatus and a process which make it easy to remove contaminants from the fuel in the fuel tank of a motor vehicle.

It is an object of the present invention to provide apparatus and a process which make it possible to convert an existing motor vehicle tank to make it possible to readily remove contaminated fuel from the tank.

It is also an object of the present invention to provide apparatus and a process which make it possible to inexpensively convert an existing motor vehicle tank to make it possible to readily remove contaminated fuel from the tank.

It is an object of the present invention to provide apparatus and a process which make it possible to convert an existing motor vehicle tank to permit it to be readily drained which does not require complex or expensive tools or equipment.

The present invention provides apparatus for permitting the fuel tank of a motor vehicle to be periodically partially or totally drained to rid the tank of contaminants including aperture means locatable on or in a portion of the fuel tank having a hole located therein and closure means for closing the opening in the aperture means. The present invention also provides a process for permitting the removal of contaminants from the fuel tank of a vehicle including the steps of providing a hole in the fuel tank, providing means for reversably closing the hole in the fuel tank and periodically removing the reversably closing means to permit contaminated fuel to be drained from the fuel tank.

BRIEF DESCRIPTION OF THE DRAWINGS

The invention will be hereinafter more fully described with reference to the accompanying drawings in which.

DETAILED DESCRIPTION OF THE PREFERRED EMBODIMENTS

Figure 1:
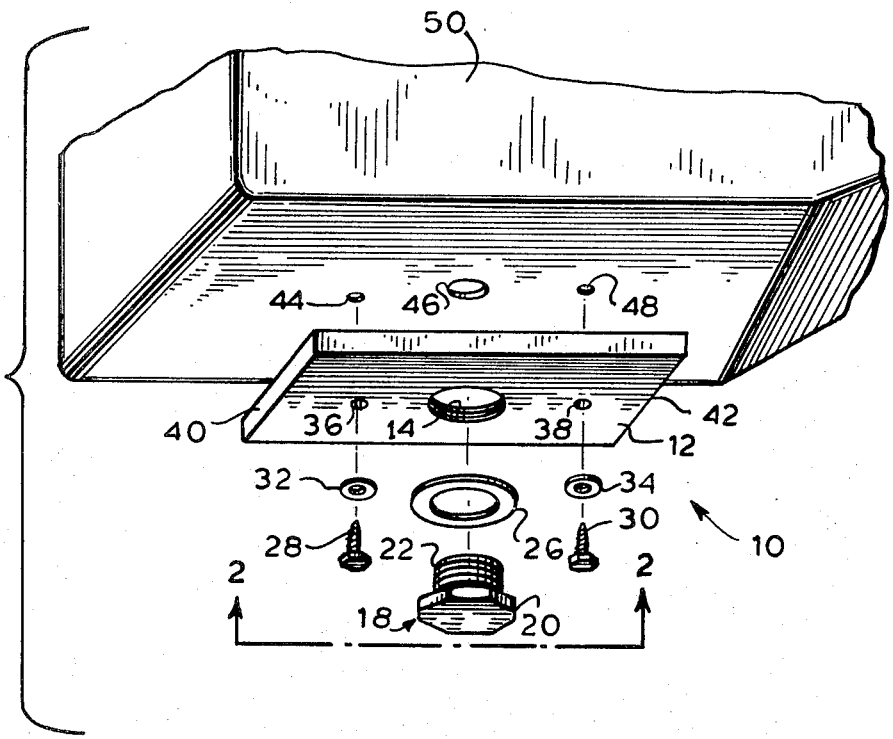
FIG. 1 is an exploded perspective view of the motor fuel tank apparatus of the invention.
Figure 2:
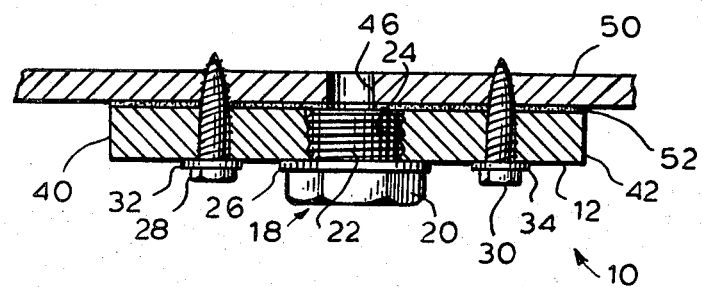
FIG. 2 is an enlarged cross sectional view of a portion of the structure illustrated in FIG. 1 taken substantially on the line 2—2 thereof.

The motor vehicle fuel tank drain apparatus of the invention is illustrated in FIGS. 1 and 2 and is designated generally by the number 10. In the preferred embodiment the fuel tank drain apparatus 10 comprises a kit which comprises an attaching member 12 which is substantially flat and rectangular shaped with a threaded hole 14 located through its central portion 16. In the preferred embodiment, the attaching member 12 comprises a flat steel plate substantially two inches wide and two and one half inches long and one quarter of an inch thick. The drain apparatus 10 also comprises closure means for closing the threaded hole 14 which comprises a bolt 18 having hexagonal head 20 and having threads 22 which mesh with the threads 24 of the hole 14. An appropriately sized oil resistant rubber washer 26 is also provided which is sized and shaped to fit around the threaded portion 22 of the bolt 18. In the preferred embodiment, the bolt 18 is a one half inch bolt.

The drain apparatus 10 also comprises two sheet metal screws 28 and 30 and respective oil resistant washers 32 and 34 which are sized and shaped to fit on the screws 28 and 30. In the preferred embodiment these screws are number ten, one inch long sheet metal screws. Two holes 36 and 38 are provided in the attaching member 12 which extend completely through the attaching member 12 and are sized to accept the screws 28 and 30. These holes 36 and 38 are centrally located substantially mid-way between the hole 14 and the respective ends 40 and 42 of the attaching member 12. Holes 44, 46 and 48 must also be provided in the fuel tank 50 at locations corresponding to the holes 34, 14 and 36 in the attaching member 12 in a manner which will hereinafter be described in detail.

The fuel tank drain apparatus 10 is used and the process of the invention is carried out in the following manner. The holes 36 and 38 are drilled in the attaching member 12 using a suitable size drill bit. The threaded hole 14 is also made in the attaching member 12 using a suitable drill and tap. The attaching member 12 is then placed on a suitable flat portion of the lowest portion of the fuel tank 50 and it is used as a template in order to scratch an outline of the attaching member 12 on the outside of the fuel tank 50 through the use of any appropriate tool known in the art (not shown). The outlined area of the outside of the fuel tank 50 is then thoroughly scraped and cleaned with a dull knife or other suitable tool (not shown). This area is then roughened up with sandpaper and cleaned with a suitable solvent such as acetone or alcohol. The appropriate surface of the attaching member 12 is also cleaned with the same solvent.

A good grade fast curing epoxy cement is then mixed and applied to the clean surface of the tank 50 and the clean surface of the attaching member 12 and the attaching member 12 is pressed into place with the bolt 18 in the hole 14 on the clean portion of the fuel tank 50 and held in place using a suitable brace (not shown). After the epoxy cement has set up, which would usually be within some ten to twenty minutes for the commonly known five minute setting epoxy, the holes 44 and 48 are drilled in the tank 50 using a number thirty or similar size small drill bit and the screws 28 and 30 with the washers 32 and 34 are promptly forced into the holes 44 and 48 and fully seated using an appropriate screw driver (not shown). In view of the washers 32 and 34 no leakage of fuel should occur from the fuel tank 50 once the screws 28 and 30 and washers 32 and 34 are in place.

After the screws 28 and 30 and washers 32 and 34 are in place which exert upward pressure on the epoxy joint 52 the bolt 18 is removed and cleaned of any epoxy. Then the bolt 18 is loosely replaced to keep out dirt. Then nothing should be done to possibly disturb the attaching member for some eight hours to allow the epoxy joint 52 to fully set. After this time a substantially one-quarter inch hole 46 is drilled into the tank 50 at a point which is centrally located within the threaded hole 14 as best illustrated in FIG. 2 and approximately one quart of fluid is allowed to drain from the tank 50 to get rid of water, dirt and sediment. The bolt 18 with the associated washer 26 is then screwed into the threaded aperture 14. Then periodically the bolt 18 and the associated washer 26 are removed to drain water, dirt, sediment and contaminated fuel from the tank 50. This should be done at approximately two month intervals and at least a quart of fluid should be drained each time.

Leakage from the fuel tank 50 should not occur, since as illustrated in FIG. 2 the inner face of the attaching member 12 is bonded by the epoxy layer 52 to the outer surface of the fuel tank 50. In addition, any possible leakage from the holes 44, 46 and 48 is prevented by the washers 32, 20 and 34 and the associated screws and bolt 28, 18 and 30.

It will be appreciated that the hole 14 might be formed initially at an appropriate location in the fuel tank 50 so that the need for the attaching member 12 and its associated screws 28 and 30 and washers 32 and 34 would be eliminated. In this case the need for any epoxy band 52 would be eliminated and all that would be required would be the periodic removal and replacement of the bolt 18 and associated washer 26 for draining in the previously described manner.

Although the invention has been described in considerable detail with reference to certain preferred embodiments, it will be understood that variations or modifications may be made within the spirit and scope of the invention as defined in the appended claims.

What is claimed is:

1. A fuel tank adaptor kit for converting an existing fuel tank of a motor vehicle to permit it to be periodically partially or totally drained to rid the fuel tank of contaminants comprising a flat metallic plate attaching member having a threaded hole located through its central portion and a plurality of unthreaded holes located away from the central portion of said flat metallic plate attaching member that extend completely through said attaching member, a threaded member for closing the threaded hole in said flat metallic plate attaching member, an oil resistant washer sized and shaped to fit around said threaded member, screw members adapted to fit into the unthreaded holes to be seated into holes in said fuel tank to secure said flat metallic plate attaching member to said fuel tank, oil resistant washers sized and shaped to fit on said screw members to prevent leakage of fuel from said fuel tank when said screw members and associated oil resistant washers are in place and means for attaching said flat metallic plate attaching member to said fuel tank comprising a cement.

2. A process for permitting the periodic removal of contaminants from an existing fuel tank in a motor vehicle comprising the steps of:
  A. Providing an attaching member having a threaded hole located therein and a plurality of holes for receiving screws for attaching said attaching member to said tank;
  B. Cleaning a portion of the outside of said fuel tank prior to securing said attaching member to the outside of said fuel tank;
  C. Applying a cement to the cleaned surface of said fuel tank and to said attaching member;
  D. Pressing said attaching member in place on said fuel tank and holding it until said cement has set up;
  E. Making holes in said fuel tank for the screws for attaching said attaching member to said tank and seating said attaching member screws into the holes in said fuel tank;
  F. Drilling a hole in said fuel tank at a point located within the threaded hole in said attaching member;
  G. Providing means for reversably closing the threaded hole in said attaching member;
  H. Periodically draining contaminated fuel from said tank through the use of said means for reversably closing the threaded hole in said attaching member.

* * * * *